(12) United States Patent
Haapapuro et al.

(10) Patent No.: US 7,162,041 B2
(45) Date of Patent: Jan. 9, 2007

(54) NOISE CANCELING MICROPHONE WITH ACOUSTICALLY TUNED PORTS

(75) Inventors: Andrew J. Haapapuro, Arlington Heights, IL (US); Viorel Drambarean, Skokie, IL (US)

(73) Assignee: Etymotic Research, Inc., Elk Grove Village, IL (US)

( * ) Notice: Subject to any disclaimer, the term of this patent is extended or adjusted under 35 U.S.C. 154(b) by 16 days.

(21) Appl. No.: 10/951,458

(22) Filed: Sep. 27, 2004

(65) Prior Publication Data

US 2005/0069156 A1     Mar. 31, 2005

Related U.S. Application Data

(60) Provisional application No. 60/507,629, filed on Sep. 30, 2003.

(51) Int. Cl.
  *A61F 11/06* (2006.01)
  *H04M 1/00* (2006.01)
  *H04R 11/04* (2006.01)

(52) U.S. Cl. ............ 381/71.7; 381/122; 381/357; 381/367; 379/433.03

(58) Field of Classification Search ............ 381/356, 381/357, 362, 367, 91, 92, 122, 71.7; 379/388.02, 379/392.01, 433.03; D14/225, 226
See application file for complete search history.

(56) References Cited

U.S. PATENT DOCUMENTS

| | | | | |
|---|---|---|---|---|
| 4,850,016 A * | 7/1989 | Groves et al. | ......... | 379/433.03 |
| 5,204,907 A * | 4/1993 | Staple et al. | ......... | 381/91 |
| 5,263,093 A * | 11/1993 | Nakamura et al. | ......... | 381/357 |
| 5,268,965 A * | 12/1993 | Badie et al. | ......... | 381/91 |
| 5,282,245 A * | 1/1994 | Anderson | ......... | 379/433.03 |
| 5,329,593 A * | 7/1994 | Lazzeroni et al. | ......... | 381/357 |
| 5,511,130 A * | 4/1996 | Bartlett et al. | ......... | 381/170 |
| 6,647,118 B1 * | 11/2003 | Miura et al. | ......... | 379/433.03 |
| 2002/0094101 A1 * | 7/2002 | De Roo et al. | ......... | 381/356 |

* cited by examiner

*Primary Examiner*—Xu Mei
(74) *Attorney, Agent, or Firm*—McAndrews, Held & Malloy, Ltd.

(57) ABSTRACT

Certain embodiments of a noise canceling microphone with acoustically tuned ports are disclosed herein. In one aspect of the invention, the noise canceling microphone may comprise a housing, a transducer for converting received energy received into electrical signals, where the transducer is located in the housing, a front and rear sound pathways to a front and rear sound openings in the transducer, where the front and rear sound pathways may be located on opposite sides of the housing and may be displaced 180 degrees off a vertical axis. The noise canceling microphone may further comprising a boom for supporting the noise canceling microphone, where the boom may be deformed to place the noise canceling microphone near the mouth of the user. For example, the boom may be deformed to place the noise canceling microphone at least ten millimeters away from the edge of the mouth of the user.

34 Claims, 6 Drawing Sheets

NOISE CANCELING MICROPHONE WITH ACOUSTICALLY TUNED PORTS

CROSS-REFERENCE TO RELATED APPLICATIONS/INCORPORATION BY REFERENCE

This application makes reference to, claims priority to, and claims the benefit of U.S. Provisional Patent Application 60/507,629, filed on Sep. 30, 2003 and entitled "Noise Canceling Microphone With Acoustically Tuned Ports," the complete subject matter of which is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Conventional omni-directional microphones are configured to convert changes in the sound pressure of an acoustic wave to mechanical vibrations of a microphone diaphragm. The microphones are typically positioned on a boom and may be located anywhere along the boom—from in front of the user's mouth to as far back as being close to the ear. When picking up the user's voice, a conventional omni-directional microphone will also pick up various background noises, such as working equipment, vibration noises, wind noise, breathing noise, and/or other voice chatter noises. Such noises may entirely drown out the user's voice, especially when the microphone is located back and away from the user's mouth.

Noise cancellation in a microphone may be provided by the use of a close-talking microphone design, wherein the pressure difference between the sound at the front and the rear ports or inlets of the microphone as the user speaks provides a microphone output that is often greater than the microphone output for more distant sounds. Even though the design of conventional close-talking microphones may reduce the pick up of extraneous noise, their overall noise reduction characteristics are not optimal.

Conventional omni-directional microphones have poor noise reduction capabilities and achieved noise attenuation levels are usually very low. In order to achieve acceptable noise attenuation levels, the conventional microphones will need to be placed in a very close proximity to the sound source, e.g., the user's mouth. When a microphone is located in front of the user's mouth, however, popping sounds accompany the plosives in the speech, causing increased noise characteristics.

Limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the invention may be found in a noise canceling microphone with acoustically tuned ports. In one aspect of the invention, the noise canceling microphone may comprise a housing, a transducer for converting received energy received into electrical signals, where the transducer is located in the housing, a front and rear sound pathways to a front and rear sound openings in the transducer, where the front and rear sound pathways may be located on opposite sides of the housing and may be displaced 180 degrees off a vertical axis. The noise canceling microphone may further comprise a boom for supporting the noise canceling microphone, where the boom may be deformed to place the noise canceling microphone near the mouth of the user.

For example, the boom may be deformed to place the noise canceling microphone at least ten millimeters away from the edge of the mouth of the user. The noise canceling microphone may also comprise one or more electric wire leads for communicating the electric signals outside the housing. The front and rear sound pathways may be mechanically tuned, for example by changing the acoustic mass and/or acoustic volume of the front and rear sound pathways, such that no electric tuning may be required. The acoustic mass and/or acoustic volume may be changed by changing at least one of the length and the area of the front and rear sound pathways. The noise canceling microphone may further comprise a single-directional microphone in the housing where the single-directional microphone may convert sound energy received into electrical signals. The noise canceling microphone may also comprise a head-set coupled to the boom.

In another aspect of the invention, the noise canceling microphone may comprise a housing, a transducer for converting received energy into electrical signals, where the transducer is located in the housing, a front and rear sound pathways to a front and rear sound openings in the transducer, where the front and rear sound pathways may be positioned and mechanically tuned such that the noise canceling microphone may provide a reduction of external acoustic noise of greater than 15 dB. The noise reduction may comprise at least 18 dB at 300 Hz.

The front and rear sound pathways may be positioned and mechanically tuned such that at least 15 dB noise reduction may be achieved without inserting-user-noticeable high frequency noise. The noise canceling microphone may further comprise a boom for supporting the noise canceling microphone, where the boom may be deformed to place the noise canceling microphone near the mouth of the user. For example, the boom may be deformed to place the noise canceling microphone at least ten millimeters away from the edge of the mouth of the user. The noise canceling microphone may also comprise one or more electric wire leads for communicating the electric signals outside the housing.

The front and rear sound pathways may be mechanically tuned, for example by changing the acoustic mass and/or acoustic volume of the front and rear sound pathways, such that no electric tuning may be required. The acoustic mass and/or acoustic volume may be changed by changing at least one of the length and the area of the front and rear sound pathways. The noise canceling microphone may further comprise a single-directional microphone in the housing where the single-directional microphone may convert sound energy received into electrical signals.

These and other advantages, aspects and novel features of the present invention, as well as details of an illustrated

DETAILED DESCRIPTION OF THE INVENTION

Aspects of the invention may be found in a noise canceling microphone with acoustically tuned ports. By changing the acoustic volume and/or acoustic mass within front and rear sound pathways in the noise canceling microphone, a noise reduction which is higher than conventional noise canceling microphones may be achieved.

Figure 1A:
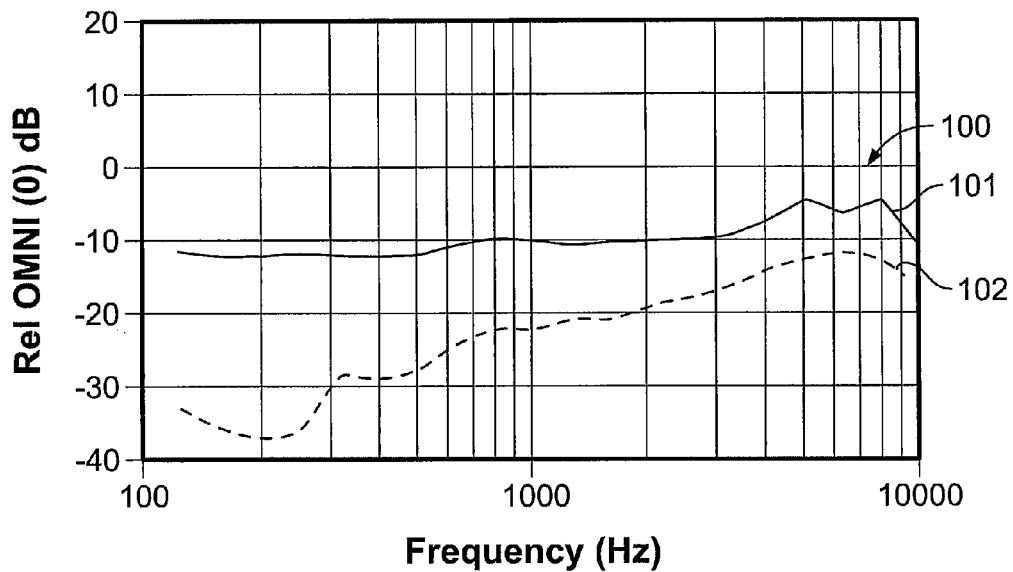
FIG. 1A is a diagram illustrating a frequency response of a noise canceling microphone with acoustically tuned ports, in accordance with an embodiment of the invention.

FIG. 1A is a diagram illustrating a frequency response of a noise canceling microphone with acoustically tuned ports, in accordance with an embodiment of the invention. In an exemplary aspect of the invention, noise attenuation levels may be measured in a noise canceling microphone with acoustically tuned ports mounted on one side of the face and may be compared to those of a reference microphone mounted on the opposite side of the face. Referring to FIG. 1A, the reference microphone's frequency response may be given a value of zero, as illustrated by the graph line 100.

Graph line 101 may represent the frequency response of the exemplary noise canceling microphone with acoustically tuned ports, relative to that of the reference microphone, when the exemplary noise canceling microphone is ten millimeters back from the sound source, such as the edge of the user's mouth. Graph line 102 may represent the response of the exemplary noise canceling microphone relative to that of the reference microphone, when the exemplary noise canceling microphone is placed as described above and the source of sound is that of a diffuse or reverberant field. The difference between response curves 101 and 102 illustrate the noise canceling property of the exemplary noise canceling microphone with acoustically tuned ports of FIG. 1A.

Figure 1B:
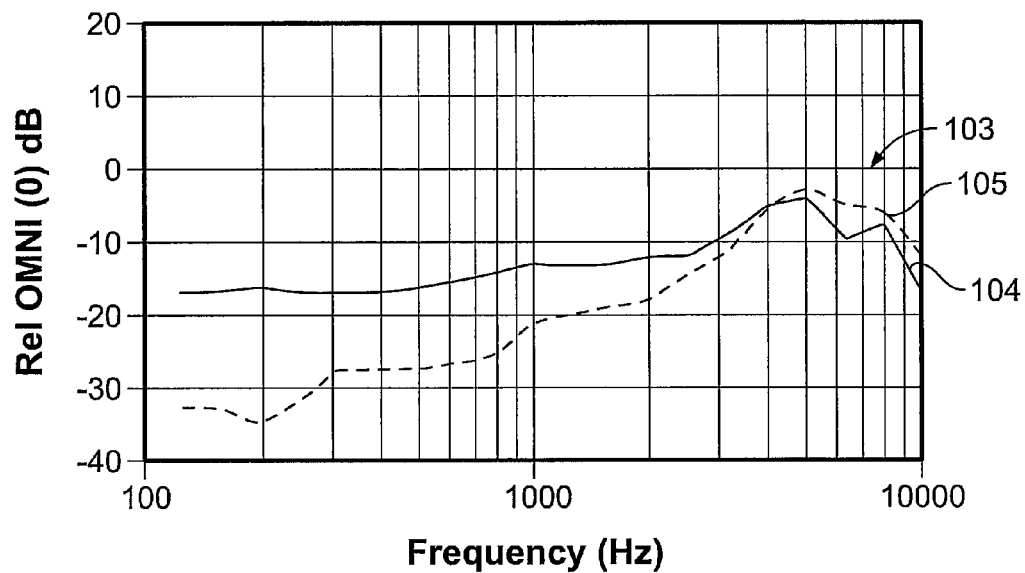
FIG. 1B is a diagram illustrating a frequency response of a conventional noise canceling microphone with noise reduction characteristics that can be compared to those of the noise canceling microphone of FIG. 1A, in accordance with an embodiment of the invention.

FIG. 1B is a diagram illustrating a frequency response of a conventional noise-canceling microphone with noise reduction characteristics that can be compared to those of the noise canceling microphone of FIG. 1A, in accordance with an embodiment of the invention. Referring to FIG. 1B, the reference microphone's frequency response may be given a value of zero, as illustrated by the graph line 103. Graph line 104 may represent the frequency response of the conventional noise canceling microphone relative to that of the reference microphone, when the conventional microphone of FIG. 1B is in the same position as the noise canceling microphone with acoustically tuned ports of FIG. 1A, or ten millimeters from the edge of the user's mouth. Graph line 105 may represent the frequency response of the conventional noise canceling microphone, relative to that of the reference microphone, when the conventional microphone is placed ten millimeters from the edge of the user's mouth and the source of the sound is that of a diffuse or reverberant field.

Referring to FIGS. 1A and 1B, the frequency response characteristics of the conventional noise canceling microphone and the noise canceling microphone with acoustically tuned ports may be represented by graph lines 104 and 101, respectively. In addition, the response of the conventional noise canceling microphone and the noise canceling microphone with acoustically tuned ports to a diffuse noise field may be represented by graph lines 105 and 102. In this manner, by comparing the frequency response characteristics of the conventional noise canceling microphone and the noise canceling microphone with acoustically tuned ports with their respective response to a diffuse noise field, may reveal an average of approximately 5 dB superior noise rejection. In addition, the noise canceling microphone with acoustically tuned ports may yield nearly flat acoustic close talking (in-situ) response throughout the entire bandwidth, as reflected by graph line 101.

In one aspect of the invention, a noise canceling microphone with acoustically tuned ports may be utilized in microphone head-set applications, for example, as well as applications utilizing voice-recognition techniques. In addition, a noise canceling microphone with acoustically tuned ports may also be utilized during a two-way conversation in a vehicle with 100 dB SPL vehicle noise, for example.

In another aspect of the invention, a noise reduction of approximately 12 dB at 1000 Hz and nearly 20 dB at 300 Hz and 8 dB at 3000 Hz may be achieved, as evidenced from a comparison of the frequency response characteristics of an exemplary noise canceling microphone with acoustically tuned ports, as represented by graph line 101, with the noise response of a reference microphone, as represented by graph line 102. The conventional noise canceling microphone, on the other hand, may achieve only 8 dB noise rejection at 1000 Hz, only approximately 10 dB noise reduction at 300 Hz, and only 2 dB noise rejection at 3000 Hz, as illustrated by graph lines 104 and 105.

In another aspect of the invention, an exemplary noise canceling microphone with acoustically tuned ports may be adapted to achieve noise reduction of at least 20 dB greater than a conventional omni-directional microphone tested under similar circumstances. For example, a conventional microphone manufactured by Jabra and tested under similar circumstances as the exemplary noise canceling microphone with acoustically tuned ports, may be characterized with a −9 dB noise reduction at 1 kHz, or 21 dB less noise reduction than the exemplary noise canceling microphone with acoustically tuned ports.

Figure 2:
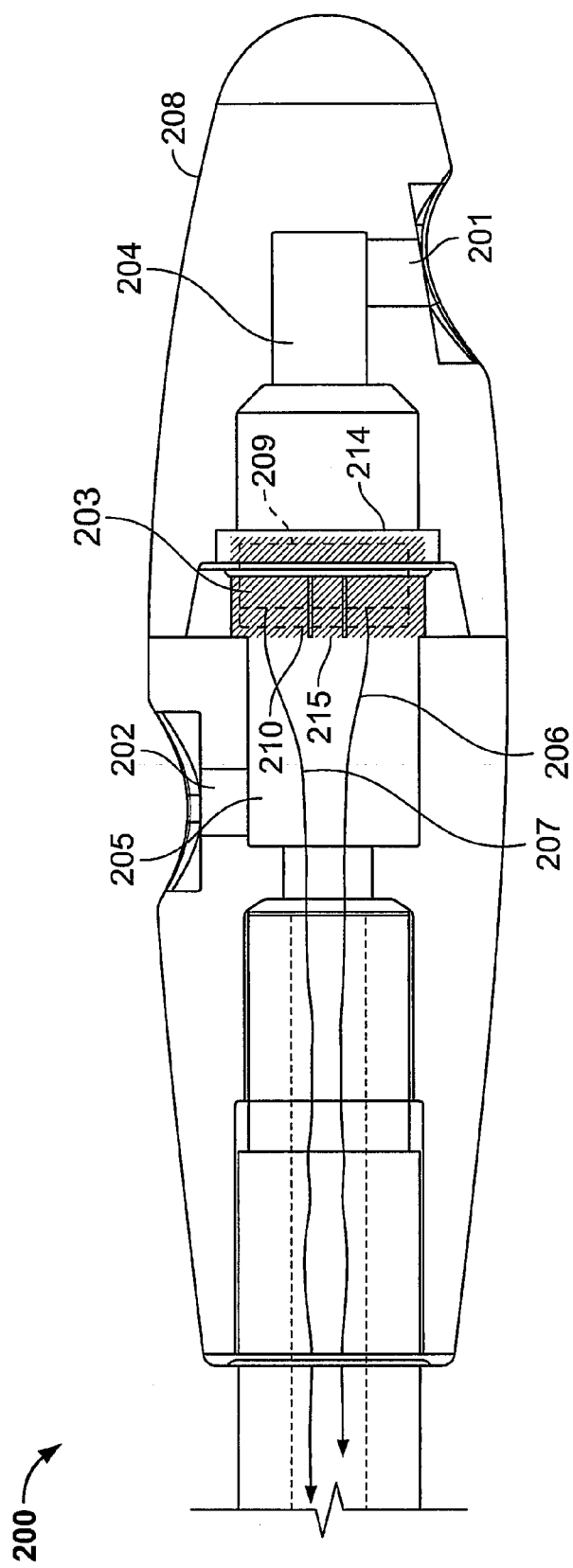
FIG. 2 is an illustration of a noise canceling microphone with acoustically tuned ports, in accordance with an embodiment of the invention.

FIG. 2 is an illustration of a noise canceling microphone with acoustically tuned ports, in accordance with an embodiment of the invention. Referring to FIG. 2, the noise canceling microphone with acoustically tuned ports 200 may comprise a microphone housing 208, a front port 201, a rear port 202, an internal microphone 203 with a front side 209 and a back side 210, a front entry canal 204, a rear entry canal 205, and microphone electric wire leads 206 and 207. The front side 209 and the back side 210 of the internal microphone 203 may comprise a front inlet 214 and a rear inlet 215, respectively.

The front port 201 is the port closer to the sound source, such as a user's mouth. In an exemplary aspect of the invention, in order to achieve higher microphone sensitivity, the front port 201 may be situated on the same horizontal plane as the sound source is. The rear port 202 may be situated on the same horizontal plane as the front port 201 and the sounds source are. However, the rear port 202 may be offset one hundred and eighty degrees off a vertical axis from the front port 201, so that the rear port may be located on the opposite side of the microphone housing 208.

The front entry canal 204 may connect the front port 201 with the front inlet 214 of the internal microphone's front side 209. The back entry canal 205 may connect the back port 202 with the rear inlet 215 of the internal microphone's back side 210. In another aspect of the invention, there may be no active electric tuning utilized with the noise canceling microphone with acoustically tuned ports. In this regard, the ports 201 and 202 may be acoustically tuned by changing the acoustic volume and/or the acoustic mass of the cavities formed by the front entry canal 204 and the back entry canal 205.

The acoustic mass M may be determined by the equation $M=0.0016 \times (L/A)$, where L is the length and A is the area of the front entry canal 204 or the back entry canal 205. The acoustic volume V may be determined by the equation $V=L \times A$. The volumes and ratio of acoustic mass to volume may be selected independently in order to optimize overall performance. The acoustic volumes of the canal cavities formed by the front entry canal 204 and the back entry canal 205 may be optimized to obtain high noise reduction level and close-talking sensitivity. While a single-directional microphone cartridge may be utilized as the internal microphone 203, the present invention is not limited in this manner and other types of microphone cartridges may be utilized within the noise canceling microphone with acoustically tuned ports 200.

Figure 3:
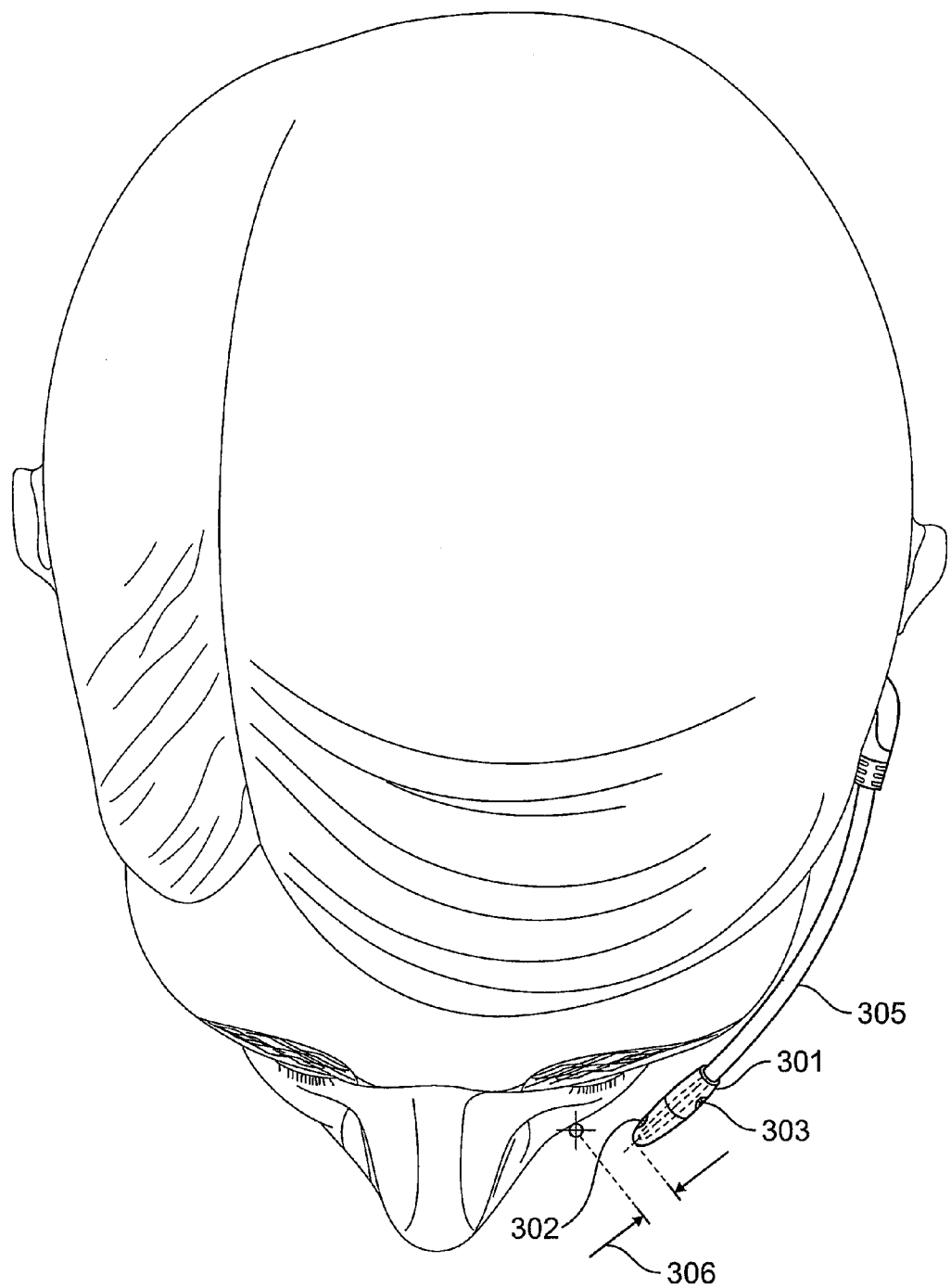
FIG. 3 is an exemplary illustration of a noise canceling microphone with acoustically tuned ports mounted on a boom, in accordance with an embodiment of the invention.

FIG. 3 is an exemplary illustration of a noise canceling microphone with acoustically tuned ports mounted on a boom, in accordance with an embodiment of the invention. Referring to FIG. 3, the noise canceling microphone with acoustically tuned ports 301 may comprise acoustically tuned front and back ports 302 and 303. The microphone 301 may be mounted on a boom 305, which may be part of a head-set. The boom 305 may be deformed so that the distance 306 between the edge of the user's mouth and the noise canceling microphone with acoustically tuned ports 301 may be changed. In an exemplary aspect of the invention, the boom 305 may be adjusted so that the distance 306 is at least ten millimeters and the noise canceling microphone with acoustically tuned ports 301 provides pop-free performance combined with excellent noise rejection.

In another aspect of the invention, the position of the microphone with acoustically tuned ports 301 may be changed relative to the sound source, such as the end of the user's mouth. In this manner, the position of the microphone 301, as well as the position of the microphone ports and the volume of the canal cavities of the front entry and the back entry, may be optimized so that the highest noise reduction and close-talk sensitivity is achieved compared to a conventional microphone.

Figure 4A:
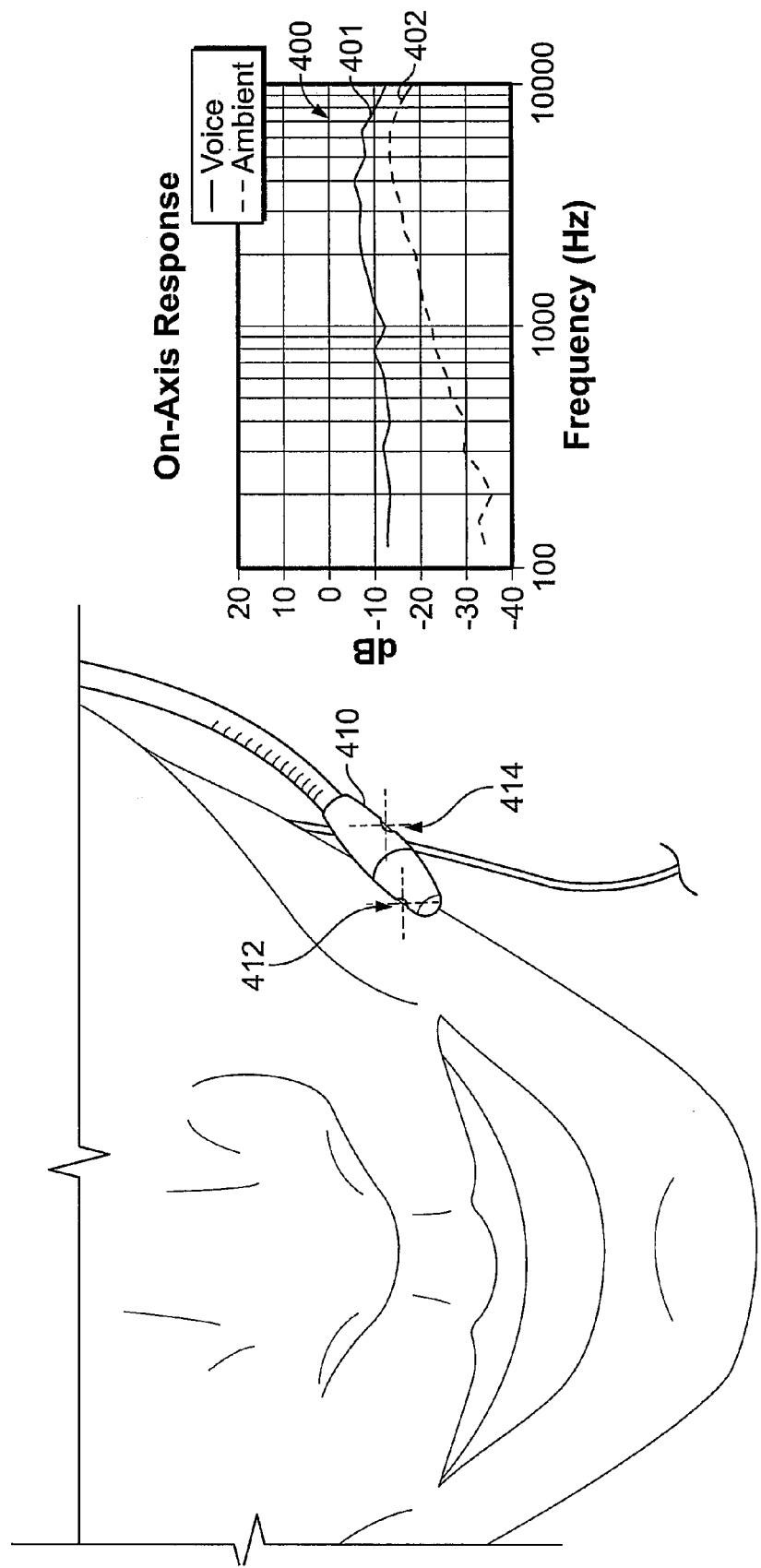
FIG. 4A is a diagram illustrating on-axis frequency response of a noise canceling microphone with acoustically tuned ports, in accordance with an embodiment of the invention.

FIG. 4A is a diagram illustrating on-axis frequency response of a noise canceling microphone with acoustically tuned ports, in accordance with an embodiment of the invention. In an exemplary aspect of the invention, noise attenuation levels and on-axis frequency response may be measured in a noise canceling microphone with acoustically tuned ports 410 mounted on one side of the face and may be compared to those of a reference microphone mounted on the opposite side of the face.

Referring to FIG. 4A, the reference microphone's frequency response may be given a value of zero, as illustrated by graph line 400. Graph line 401 may represent the on-axis frequency response of the exemplary noise canceling microphone 410 with acoustically tuned ports, relative to that of the reference microphone. Graph line 402 may represent a frequency response to a testing level of ambient noise as a result of the use of the noise canceling microphone 410. In this case, the first-microphone inlet 412 is close to the mouth and the second microphone inlet 414 is away from the mouth on the outside of the microphone pod and, as a result, optimal level of noise reduction may be achieved. For example, approximately 10 dB in noise reduction may be achieved at 1000 Hz and approximately 20 dB of noise reduction at 300 Hz.

Figure 4B:
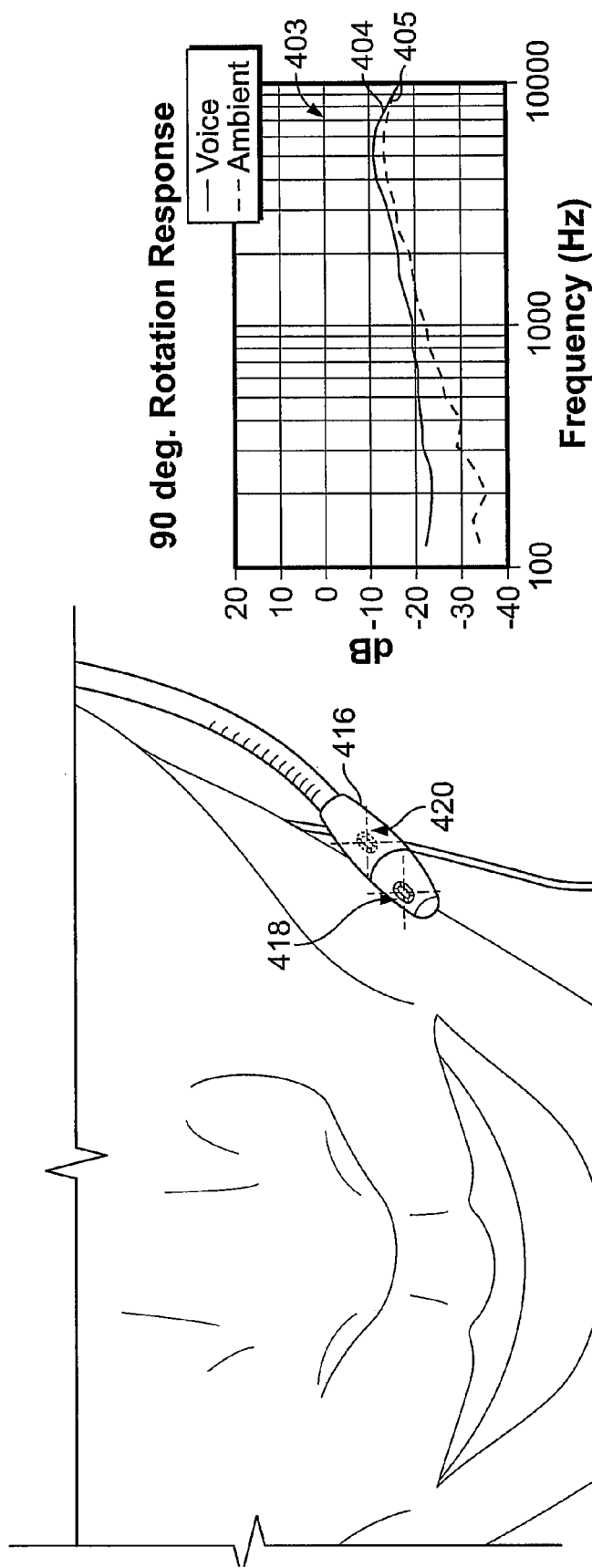
FIG. 4B is a diagram illustrating a 90-degree rotation frequency response of a noise canceling microphone with acoustically tuned ports, in accordance with an embodiment of the invention.

FIG. 4B is a diagram illustrating a 90-degree rotation frequency response of a noise canceling microphone with acoustically tuned ports, in accordance with an embodiment of the invention. In an exemplary aspect of the invention, noise attenuation levels and 90-degree rotation frequency response may be measured in a noise canceling microphone with acoustically tuned ports 416 mounted on one side of the face and may be compared to those of a reference microphone mounted on the opposite side of the face.

Referring to FIG. 4B, the reference microphone's frequency response may be given a value of zero, as illustrated by graph line 403. Graph line 404 may represent the 90-degree rotation frequency response of the exemplary noise canceling microphone with acoustically tuned ports 416, relative to that of the reference microphone. Graph line 405 may represent a frequency response to a testing level of ambient noise as a result of the use of the noise canceling microphone 416. In this case, the microphone pod of the noise canceling microphone 416 may be turned 90 degrees, so that the rear inlet port 420 faces down and the front inlet port 418 faces up. As a result, noise reduction levels decrease in comparison to the noise reduction levels illustrated on FIG. 4A. For example, approximately 5 dB in noise reduction may be achieved at 1000 Hz and approximately 10 dB of noise reduction at 300 Hz.

Figure 4C:
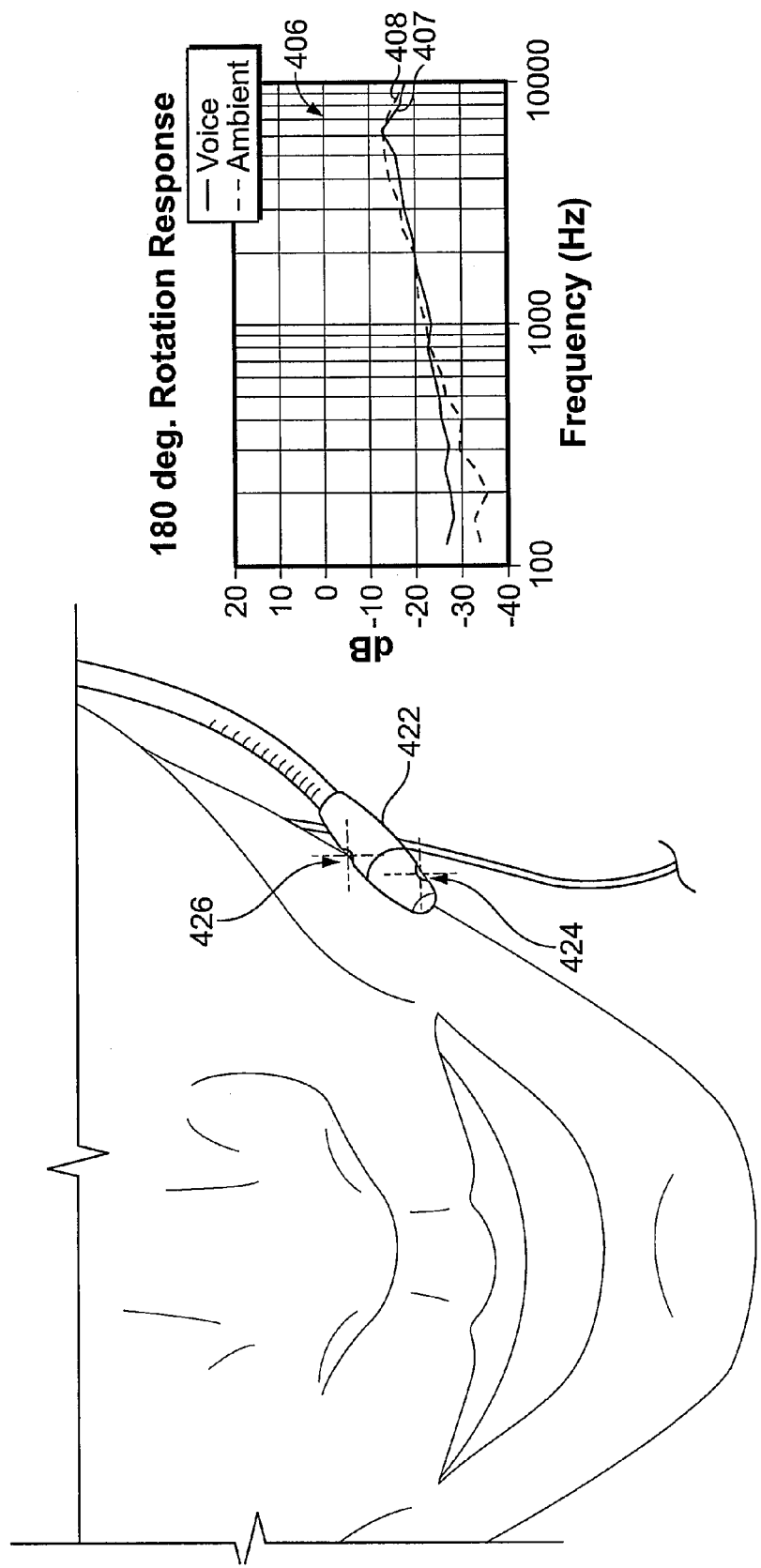
FIG. 4C is a diagram illustrating a 180-degree rotation frequency response of a noise canceling microphone with acoustically tuned ports, in accordance with an embodiment of the invention.

FIG. 4C is a diagram illustrating a 180-degree rotation frequency response of a noise canceling microphone with acoustically tuned ports, in accordance with an embodiment of the invention. In an exemplary aspect of the invention, noise attenuation levels and 180-degree rotation frequency response may be measured in a noise canceling microphone with acoustically tuned ports 422 mounted on one side of the face and may be compared to those of a reference microphone mounted on the opposite side of the face.

Referring to FIG. 4C, the reference microphone's frequency response may be given a value of zero, as illustrated by graph line 406. Graph line 407 may represent the 180-degree rotation frequency response of the exemplary noise canceling microphone with acoustically tuned ports 422, relative to that of the reference microphone. Graph line 408 may represent a frequency response to a testing level of ambient noise as a result of the use of the noise canceling microphone 422. In this case, the microphone pod of the noise canceling microphone 422 may be turned 180 degrees, so that the rear inlet port 422 is closest to the face and the front inlet port 424 is away from the face. As a result, noise reduction levels decrease even further in comparison to the noise reduction levels illustrated on FIGS. 4A and 4B. For example, approximately −2 dB in noise reduction may be achieved at 1000 Hz and approximately 3 dB of noise reduction at 300 Hz.

While the invention has been described with reference to certain embodiments, it will be understood by those skilled in the art, that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A noise canceling microphone comprising:
   a housing;
   at least one transducer located in the housing, the at least one transducer for converting sound energy received into electrical signals;
   a front sound pathway to a front sound opening in the at least one transducer, wherein the front sound pathway comprises a front port passage with a first diameter and a first length and a front entry canal with a second diameter and a second length;
   a rear sound pathway to a rear sound opening in the at least one transducer; and
   the front and rear sound pathways being located on opposite sides of the housing and being displaced 180 degrees off a vertical axis, wherein the front and rear sound pathways are located entirely within the housing, and wherein the front port passage and the front entry canal are located at an angle relative to each other that is greater than 0° and smaller than 180°.

2. The noise canceling microphone according to claim 1, further comprising a boom for supporting the noise canceling microphone.

3. The noise canceling microphone according to claim 2, wherein the boom may be deformed to place the noise canceling microphone near the mouth of the user.

4. The noise canceling microphone according to claim 3, wherein the boom is deformed to place the noise canceling microphone at least ten millimeters away from the edge of the mouth of the user.

5. The noise canceling microphone according to claim 1, further comprising a plurality of electric wire leads for communicating the electric signals outside the housing.

6. The noise canceling microphone according to claim 1, wherein the front and rear sound pathways are mechanically tuned such that no electric tuning is required.

7. The noise canceling microphone according to claim 6, wherein the front and rear sound pathways are mechanically tuned by changing the acoustic mass of the sound and rear sound pathways.

8. The noise canceling microphone according to claim 7, wherein the acoustic mass is changed by changing at least one of the length and the area of the front and rear sound pathways.

9. The noise canceling microphone according to claim 6, wherein the front and rear sound pathways are mechanically tuned by changing the acoustic volume of the sound and rear sound pathways.

10. The noise canceling microphone according to claim 9, wherein the acoustic volume is changed by changing at least one of the length and the area of the front and rear sound pathways.

11. The noise canceling microphone according to claim 1, further comprising a single-directional microphone in the housing, the single-directional microphone for converting sound energy received into electrical signals.

12. The noise canceling microphone according to claim 2, further comprising a head-set coupled to the boom.

13. A noise canceling microphone comprising:
    a housing;
    at least one transducer located in the housing, the at least one transducer for converting sound energy received into electrical signals;
    a front sound pathway to a front sound opening in the at least one transducer, wherein the front sound pathway comprises a front port passage with a first diameter and a first length and a front entry canal with a second diameter and a second length;
    a rear sound pathway to a rear sound opening in the at least one transducer; and
    the front and rear sound pathways being positioned and mechanically tuned such that the noise canceling microphone provides a reduction of external acoustic noise of greater than 15 dB, wherein the front and rear sound pathways are located entirely within the housing, and wherein the front port passage and the front entry canal are located at an angle relative to each other that is greater than 0° and smaller than 180°.

14. The noise canceling microphone according to claim 13, wherein the noise reduction comprises at least 18 dB at 300 Hz.

15. The noise canceling microphone according to claim 13, wherein the front and rear sound pathways are positioned and mechanically tuned such that at least 15 dB noise reduction is achieved without inserting user-noticeable high frequency noise.

16. The noise canceling microphone according to claim 13, further comprising a boom for supporting the noise canceling microphone.

17. The noise canceling microphone according to claim 16, wherein the boom may be deformed to place the noise canceling microphone near the mouth of the user.

18. The noise canceling microphone according to claim 17, wherein the boom is deformed to place the noise canceling microphone at least ten millimeters away from the edge of the mouth of the user.

19. The noise canceling microphone according to claim 13, further comprising a plurality of electric wire leads for communicating the electric signals outside the housing.

20. The noise canceling microphone according to claim 13, wherein the front and rear sound pathways are mechanically tuned by changing the acoustic mass of the sound and rear sound pathways.

21. The noise canceling microphone according to claim 20, wherein the acoustic mass is changed by changing at least one of the length and the area of the front and rear sound pathways.

22. The noise canceling microphone according to claim 13, wherein the front and rear sound pathways are mechanically tuned by changing the acoustic volume of the sound and rear sound pathways.

23. The noise canceling microphone according to claim 22, wherein the acoustic volume is changed by changing at least one of the length and the area of the front and rear sound pathways.

24. The noise canceling microphone according to claim 13, further comprising a single-directional microphone in the housing, the single-directional microphone for converting sound energy received into electrical signals.

25. The noise canceling microphone according to claim 1, wherein the second diameter is larger than the first diameter.

26. The noise canceling microphone according to claim 1, wherein the front sound pathway is mechanically tuned by changing at least one of: the first diameter, the first length, the second diameter, and the second length.

27. The noise canceling microphone according to claim 1, wherein the front entry canal comprises at least two canal portions with different diameters.

28. The noise canceling microphone according to claim 1, wherein the rear sound pathway comprises a rear port passage with a third diameter and a third length and a rear entry canal with a fourth diameter and a fourth length.

29. The noise canceling microphone according to claim 28, wherein the fourth diameter is larger than the third diameter.

30. The noise canceling microphone according to claim 28, wherein the rear sound pathway is mechanically tuned by changing at least one of: the third diameter, the third length, the fourth diameter, and the fourth length.

31. The noise canceling microphone according to claim 1, wherein the housing is of elongated oblate spheroid shape.

32. The noise canceling microphone according to claim 1, wherein the front sound pathway extends from a front housing opening to the front sound opening in the at least one transducer, and the rear sound pathway extends from a rear housing opening to the rear sound opening in the at least one transducer.

33. The noise canceling microphone according to claim 32, wherein the front housing opening and the rear housing opening are located on opposite sides of the housing.

34. The noise canceling microphone according to claim 32, wherein a first location for the front housing opening and a second location for the rear housing opening are selected to minimize diffraction of sound flow when the noise canceling microphone is worn by a user.

\* \* \* \* \*